United States Patent
Graham et al.

(10) Patent No.: US 10,030,734 B2
(45) Date of Patent: Jul. 24, 2018

(54) SYSTEM FOR ADJUSTING TORSIONAL FREQUENCY OF A POWER TRAIN

(71) Applicant: General Electric Company, Schenectady, NY (US)

(72) Inventors: Nicholas Simon Graham, Greenville, SC (US); Raymond Andrew Vincent, Fountain Inn, SC (US); George Kaliope, Greer, SC (US); Paul Stukenborg, Colonie, NY (US)

(73) Assignee: General Electric Company, Schenectady, NY (US)

( * ) Notice: Subject to any disclaimer, the term of this patent is extended or adjusted under 35 U.S.C. 154(b) by 479 days.

(21) Appl. No.: 14/281,573

(22) Filed: May 19, 2014

(65) Prior Publication Data

US 2014/0251074 A1    Sep. 11, 2014

Related U.S. Application Data

(62) Division of application No. 13/236,975, filed on Sep. 20, 2011, now Pat. No. 8,732,927.

(51) Int. Cl.
*F16F 7/10* (2006.01)
*F16D 1/033* (2006.01)

(52) U.S. Cl.
CPC ............ *F16F 7/10* (2013.01); *F16D 1/033* (2013.01); *F16F 7/1034* (2013.01);
(Continued)

(58) Field of Classification Search
CPC ............ F16F 7/10; F16F 7/1034; F16D 1/033
(Continued)

(56) References Cited

U.S. PATENT DOCUMENTS 1,499,618 A    7/1924   Kasley
1,645,323 A *  10/1927  Griswold ............ F16F 15/34
                                                464/180
(Continued)

FOREIGN PATENT DOCUMENTS

DE    102008006782    4/2009
EP    1398608 A2      3/2004

OTHER PUBLICATIONS

Universal Joint and Driveshaft Design Manual, AE-7, Society of Automotive Engineers, Inc., Warrendale, PA, Chapter 1 and Section 9.4.2, TJ1079.S62 1979.*

(Continued)

*Primary Examiner* — Greg Binda
(74) *Attorney, Agent, or Firm* — Nixon & Vanderhye PC

(57) ABSTRACT

A load coupling device for a power train including: a rotatable shaft; a first flange on a first end of the shaft, wherein the first flange is adapted to couple to a first rotating shaft of at a torque producing turbine or a torque driven electrical generator; a second flange on an opposite end of the shaft, wherein the shaft is adapted to couple to a second rotating shaft of the other of the turbine and the generator, and an annular ring extending radially outward from the first flange, wherein the mass of the annular ring is selected to shift a torsional natural frequency of the power train away from an operational condition of the power train. Trim masses may be added to make fine adjustments to the torsional natural frequency of the power train.

7 Claims, 11 Drawing Sheets

(52) U.S. Cl.
CPC ........ *Y10T 74/2121* (2015.01); *Y10T 74/2122* (2015.01); *Y10T 403/64* (2015.01); *Y10T 464/50* (2015.01)

(58) Field of Classification Search
USPC ................ 464/127, 180; 74/573.1, 574.4; 188/378–380; 403/337; 416/500
See application file for complete search history.

(56) References Cited

U.S. PATENT DOCUMENTS

| | | | |
|---|---|---|---|
| 1,916,086 A * | 6/1933 | Tibbetts | F16F 15/1202 74/574.4 |
| 2,379,175 A | 6/1945 | Mulheim | |
| 2,446,405 A | 8/1948 | Bels | |
| 2,593,877 A | 4/1952 | Hagenlocher | |
| 2,611,632 A | 9/1952 | Harris | |
| 2,696,346 A | 12/1954 | Marchant et al. | |
| 2,878,689 A | 3/1959 | Aebersold | |
| 3,992,963 A | 11/1976 | Khanna | |
| 4,006,607 A | 2/1977 | Kane | |
| 4,140,028 A | 2/1979 | Desjardins | |
| 4,217,767 A | 8/1980 | Eckley | |
| 4,516,955 A * | 5/1985 | Worner | F16F 15/1435 188/379 |
| 4,607,971 A | 8/1986 | Hartmann et al. | |
| 4,728,255 A | 3/1988 | Kirkpatrick et al. | |
| 4,782,936 A | 11/1988 | Bopp | |
| 5,036,726 A | 8/1991 | Wolf et al. | |
| 5,131,782 A | 7/1992 | Bruno et al. | |
| 5,346,432 A | 9/1994 | Greulich et al. | |
| 5,354,237 A | 10/1994 | Amborn et al. | |
| 5,528,348 A | 6/1996 | Miwa et al. | |
| 5,720,205 A * | 2/1998 | Harrington | F16F 15/173 74/573.1 |
| 5,746,550 A | 5/1998 | Iacono et al. | |
| 6,463,827 B1 | 10/2002 | Oetiker | |
| 6,471,453 B1 | 10/2002 | Winebrenner et al. | |
| 8,038,540 B2 | 10/2011 | Hoeks et al. | |
| 9,145,923 B2 * | 9/2015 | Graham | F16D 1/02 |
| 2004/0049357 A1 | 3/2004 | Delvaux et al. | |
| 2004/0069092 A1 | 4/2004 | Schankin et al. | |
| 2006/0223640 A1 | 10/2006 | Bassett et al. | |
| 2007/0188026 A1 | 8/2007 | Bi | |
| 2007/0270229 A1 | 11/2007 | Nozaki et al. | |
| 2009/0293654 A1 | 12/2009 | Pintauro | |
| 2010/0141193 A1 | 6/2010 | Rotondo et al. | |
| 2014/0356047 A1 * | 12/2014 | Vincent | F16D 1/033 |

OTHER PUBLICATIONS

Universal Joint and Driveshaft Design Manual, AE-7, Society of Automotive Engineers, Inc., Warrendale, PA, Chapter 10, TJ1079.S62 1979.*

EP Search Report and Written Opinion dated Nov. 29, 2013, issued in connection with corersponding EP Patent Application No. 12184387.4.

* cited by examiner

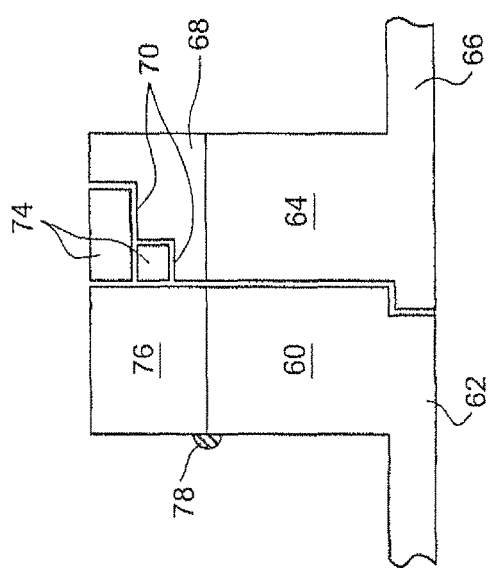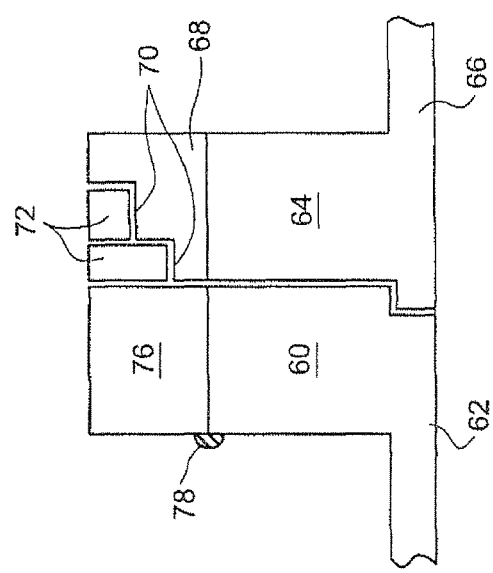

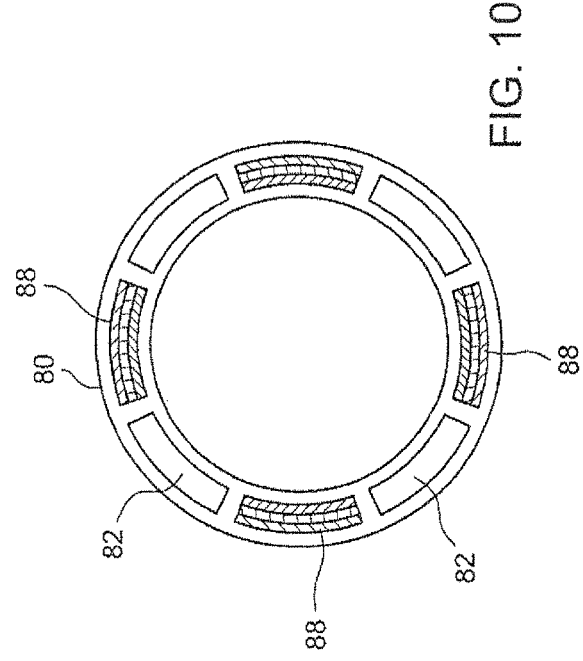
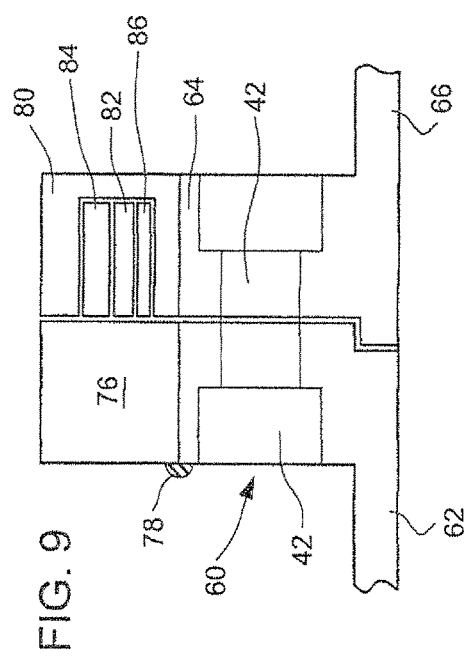
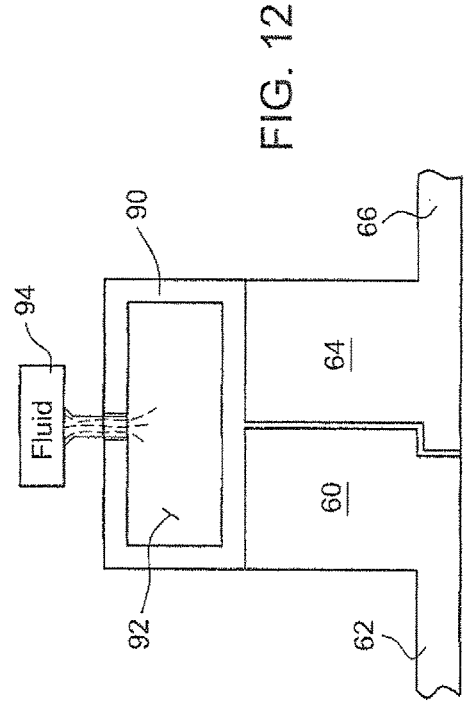

SYSTEM FOR ADJUSTING TORSIONAL FREQUENCY OF A POWER TRAIN

RELATED APPLICATION

This application is a divisional of U.S. patent application Ser. No. 13/236,975 (now U.S. Pat. No. 8,732,927) filed Sep. 20, 2011, the entirety of which application is incorporated by reference.

BACKGROUND OF THE INVENTION

The invention relates generally to compensating for torsional frequency in a power train or other systems including rotating bodies.

Power trains are typically mechanical and electrical systems that generate and deliver power. An example of a power train is a turbine and generator coupled by a load coupling. The turbine applies torque to the load coupling which drives the generator that produces electrical power.

Vibrations in the power train are induced by cyclical variations in the torque or other forces applied to or by the power train. If the frequencies of these cyclical variations coincide with the natural frequencies of the power train, the cyclical variations may cause excessive torsional vibrations in the power train.

Power trains are often designed to operate away from their torsional natural frequencies. Despite well intentioned designs, power trains may experience cyclical variations in torque at frequencies at or near the natural frequencies. Under these cyclical variations, the power train may excessively vibrate and be damaged. There is a long felt need for devices and methods to adjust the inertia and natural torsional frequencies of a power train and other rotating bodies.

The turbine and generator in an industrial power train are typically large and heavy devices. A turbine may be an industrial gas turbine or steam turbine which are large and heavy power generation units. Similarly, the generators may be large generators used by utilities to produce electrical power. Due to their large size and mass, it is difficult to modify the turbines and generators after they have been installed sufficiently to shift the natural frequencies at which they vibrate. There is a long felt need to adjust the inertia and natural torsional frequencies of industrial power trains that does not require substantial changes to the turbines or generators.

SUMMARY OF INVENTION

A device and method has been developed to modify the torsional natural frequency of a power train. The device allows for modification of the moment of inertia of the power train. The moment of inertia may be adjusted by arranging masses positioned in an annular array around a flange of the load coupling. By removing, adding or changing the masses, the moment of inertia of the load coupling is changed. A change in the moment of inertia moves the torsional natural frequencies for the load coupling and power train. By proper selection and positioning of the masses around the load coupling, the torsional natural frequencies of the power train may be adjusted to provide adequate torsional frequency margins for the power train during expected operational conditions.

A load coupling device for a power train has been conceived which includes: a rotatable shaft; a first flange on a first end of the shaft, wherein the first flange is adapted to couple to a first rotating shaft of a torque producing power supply or a torque driven power load; a second flange on an opposite end of the shaft, wherein the shaft is adapted to couple to a second rotating shaft of the other of the torque power supply and the torque driven power load, and an additional mass added to the first flange, wherein the additional mass is selected to shift a torsional natural frequency of the power train away from an operational condition of the power train.

The additional mass may be an annular ring extending radially outward from a coupling region of the first flange, wherein the coupling region of the first flange receives fasteners to secure the first flange to a flange of the first rotating shaft. The annular ring may be integral with the first flange, wherein the load coupling is adapted to be substituted for an existing load coupling in the power train. The annular ring may be fitted to an outer circumference of the first flange.

The load coupling device may further include trim masses adapted to be sequentially added to the additional mass. The trim masses may be plugs arranged in an annular array, rings or plates arranged in an annular array. The plugs may be removable trim mass plugs arranged in a circular array in the annular ring.

A load coupling device has been conceived for a power train comprising: a rotatable shaft; a first flange on a first end of the shaft, wherein the first flange is adapted to couple to a first rotating shaft of a torque producing turbine or a torque driven electrical generator; a second flange on an opposite end of the shaft, wherein the shaft is adapted to couple to a second rotating shaft of the other of the turbine and the generator, and an annular ring extending radially outward from the first flange, wherein the mass of the annular ring is selected to shift a torsional natural frequency of the power train away from an operational condition of the power train.

A power train has been conceived comprising: a torque producing power source including a rotating connecting flange; a torque driven power load including a rotating connecting flange; a load coupling having a first flange adapted to couple to the connecting flange of one of the torque producing power source and the torque driven power load; a second flange on load coupling adapted to couple to the coupling flange of the other of the torque producing power source or the torque driven power load, and an additional mass added to at least one of the connecting flanges or the load coupling wherein the additional mass is selected to shift a torsional natural frequency of the power train away from an operational condition of the power train.

A method has been conceived to shift a torsional natural frequency of a power train including a load coupling the torque output of a turbine to drive an electrical generator, the method comprising: determining the power train has a torsional natural frequency which is excessively excited during an anticipated operational condition of the power train; adding an annular ring or annular array to the load coupling to shift the torsional natural frequency response of the power train, and determining if the power train operating with the load coupling having the annular ring or the annular array does not excessively excite the shifted torsional natural frequency during the anticipated operational conditions of the power train.

BRIEF DESCRIPTION OF THE DRAWINGS

The invention, including its best mode, is disclosed in the following figures where:

FIGS. 7 and 8 are cross-sectional views of further embodiments of additional masses added to the flanges of a load coupling and flanges of a rotor or turbine shaft.

FIGS. 9 and 10 are a cross-sectional views, taken parallel to the load coupling axis and perpendicular to the axis respectively, of a further embodiment of additional masses added to the flanges of a load coupling and flanges of a shaft of a power train.

FIG. 11 is a perspective view of a plate which is inserted in a chamber of a mass ring.

FIG. 12 is a cross-sectional view of a further embodiment of adding mass to the flanges of a load coupling.

DETAILED DESCRIPTION OF THE INVENTION

Figure 1:
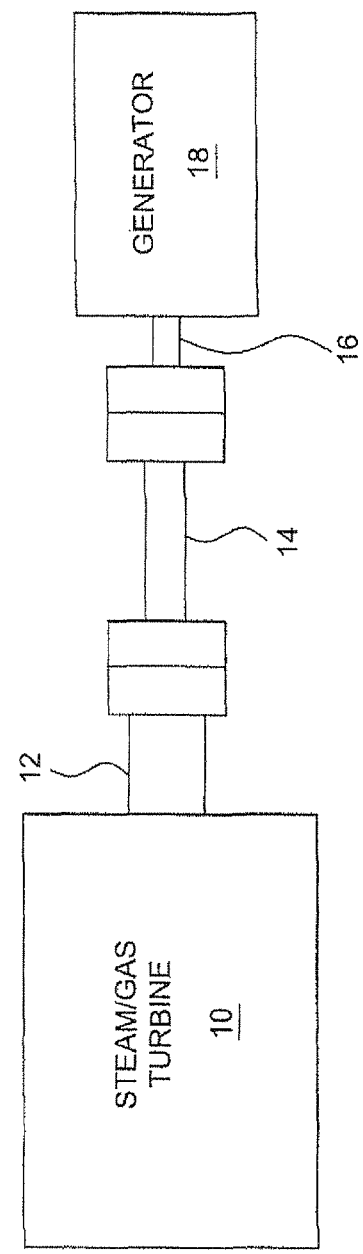
FIG. 1 is a schematic diagram a power train having a load coupling.

FIG. 1 is a schematic illustration of a conventional power train having a steam or gas turbine 10 with a rotor shaft 12, which is attached to a first end of a load coupling 14. The opposite end of the load coupling is attached to the rotor 16 of an electrical generator 18.

The power train will be typically designed such that its operating conditions avoid the torsional natural frequencies. For example, the normal operating rotating speed of the rotors and load coupling may be selected to avoid the torsional natural frequencies of the power train. The design requirements of the power train may include margins each centered on a torsional natural frequency. The power train is to be operated at rotational speeds that avoid these margins so as to avoid exciting the torsional natural frequencies.

Despite efforts to design a power train to avoid torsional natural frequencies it may be discovered during testing or other operation of the power train that torsional natural frequencies are excited at normal operating conditions. If one or more of the torsional natural frequencies of the power train are excited during operating conditions or if the power train has insufficient torsional frequency margins, there is a need to modify the torsional frequency of the power train.

The power train has one or more natural frequencies which may be excited by torsional vibrations occurring at or near a torsional natural frequency. The natural frequencies of the power train are dependent on the inertia of the power train. The inertia of the load coupling is a component of the inertia of the power train. Because the inertia of the load coupling affects the natural frequencies of the power train, the natural frequencies of the power train may be adjusted by changing the inertia of the load coupling.

Figure 2:
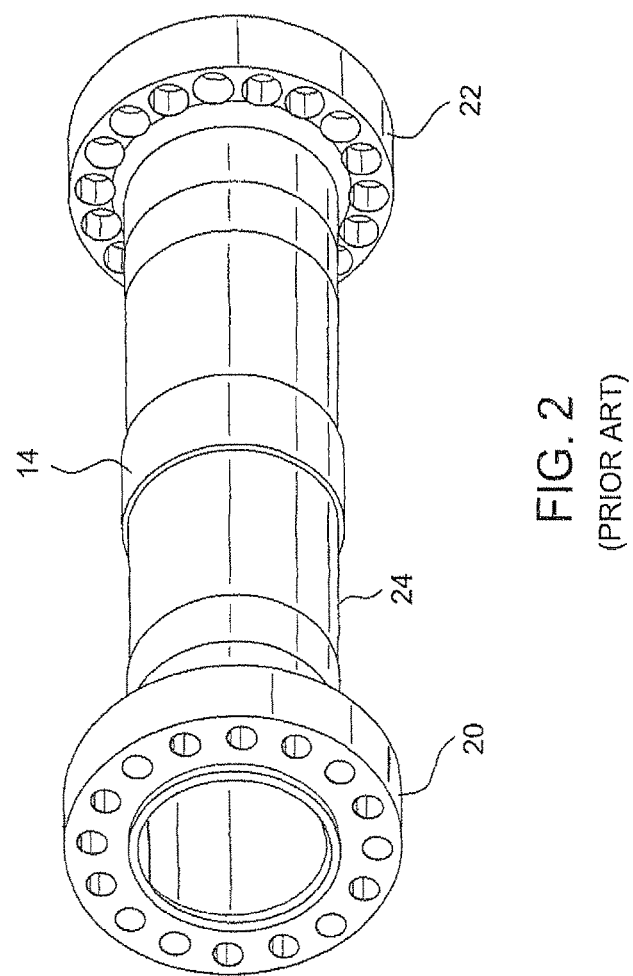
FIG. 2 is a perspective view of a conventional load coupling.

FIG. 2 shows a conventional load coupling 14 having annular flanges 20, 22 at opposite ends of a cylindrical drive shaft 24. The flanges include holes that receive bolts or other fasteners to attach to a mating flange at the end of the rotors of the turbine and generator. The load coupling transfers the torque applied by the rotor for the turbine to drive the rotor for the generator. The conventional load coupling 14 does not offer the ability to adjust the mass or inertia of the load coupling.

Figure 3:
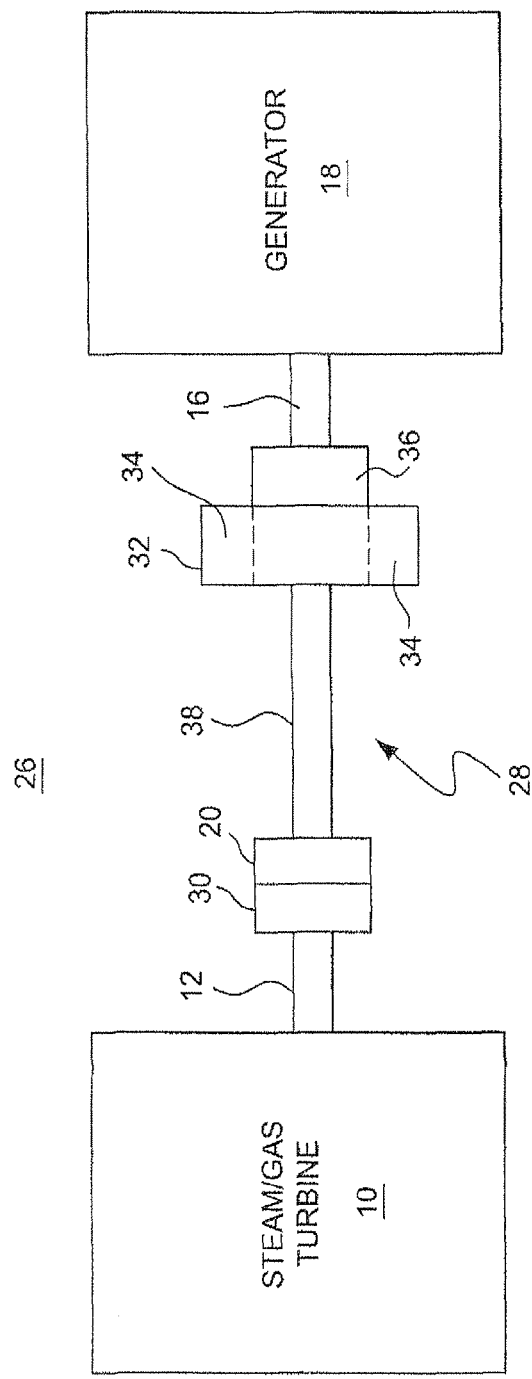
FIG. 3 is a schematic diagram of a power train having a load coupling having a mass adjustment.

FIG. 3 shows a power train 26 including a steam or gas turbine 10 having a rotor 12, a load coupling 28, an electrical generator 18 with a rotor shaft 16. The load coupling 28 may include a normal sized flange 20 which couples to a similarly sized flange 30 on the rotor shaft for either the turbine or generator. The flange 32 on the opposite end of the load coupling 28 may be oversized or have mass attachments 34 on its circumference. The radially inward region of the flange 32 may attach to a similarly sized flange 36 on the rotor for the generator or turbine. In alternative embodiments, the flange which is oversized or has a ring or other mass attachment may be the flanges on the rotor for the turbine or generator. Similarly, the flange which is oversized or has a mass attachment may be coupled to one or more of the shafts 12, 38 and 16 for the turbine, load coupling and generator.

Figure 4:
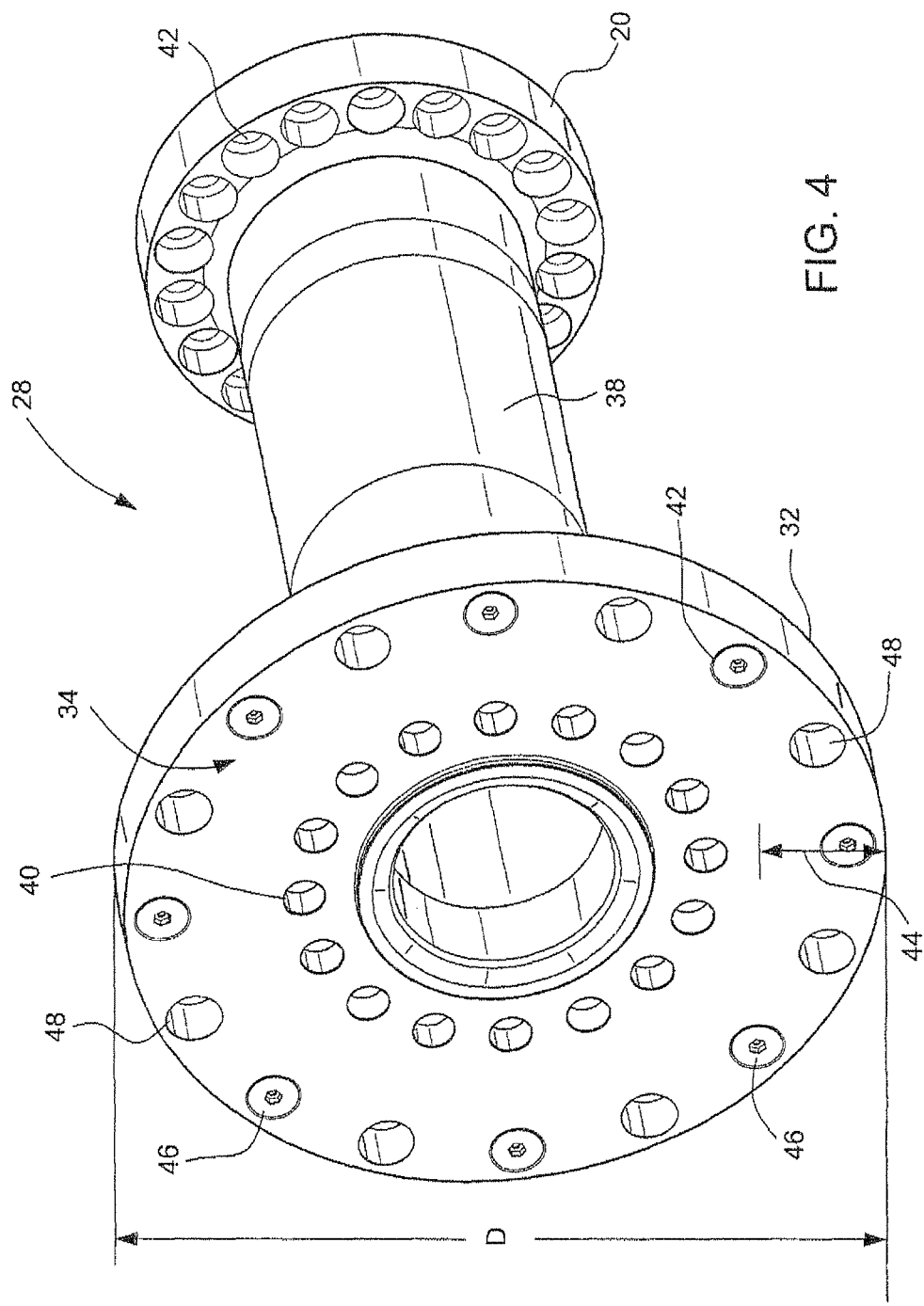
FIG. 4 is a perspective view of a load coupling with the mass adjustment.

FIG. 4 is a perspective view of the front and side of the load coupling 28 having an oversized flange 32. As compared to the traditional sized flange 20, the oversized flange may have a substantially larger diameter (D). The radially inward circular array of holes 40 receive the bolts that couple the load coupling to the rotor shaft of the turbine or generator. A similar array of bolt holes 42 are on the flange 20 at the opposite end of the load coupling.

A radially outer region 44 of the large sized flange 32 has an adjustable mass and hence adjustable inertia. In the example shown in FIG. 4, the adjustable mass is provided by mass plugs 46 inserted in a circular array of holes 48, e.g., threaded holes, in the outer region 44. The plugs 46 may be removable from the holes 48, and may be inserted in all of the holes 48 in the circular array.

The increased diameter of the flange 32 results in a different inertia for the load coupling 28 as compared to the inertia of the conventional load coupling 14. The change in inertia due to substituting the load coupling 28 for the conventional load coupling 14 may be used to shift the torsional natural frequencies of the power train. The shift in the inertia will change the natural frequencies of power train. The shift in the natural frequency is intended to avoid the frequencies of torsional vibrations applied to or generated by the power train. The intended shift in the natural frequencies by rearranging and replacing the plugs should result in a power train which does not experience excessive torsional vibration and has sufficient torsional frequency margin. In addition to substituting load couplings or in the alternative, plugs, rings or other additional masses may be added to the outer radial portion of one or more flanges associated with the load coupling or the rotor shafts for the turbine or generator.

A substitute load coupling 28 or masses added to the perimeter of an existing flange, such as on the in-place load coupling, may be installed without moving the turbine or generator and without making substantial changes to other components adjacent the load coupling. The existing load coupling 14 may be unbolted from the rotors 12, 16 of the turbine and generator, and removed by a crane. The substitute load coupling 28 with large diameter flange 32 may be positioned by the crane between the rotor shafts 12, 16 such that the bolt openings 40, 42 are aligned with the bolt openings in the rotor shaft flanges for the turbine and generator. Bolts are inserted through the bolt openings to couple the load coupling 28 to the rotor shafts 12, 16 of the turbine and generator.

Plugs 46 having various masses may be available for insertion in the holes 48. The plugs may be used to tune the frequency response of the power train and, particularly, shift its torsional natural frequencies. For example, during initial setup of the power train, the plugs 46 inserted in all of the holes 48 may each have substantially the same density, e.g., formed of the same material, as the material forming the large sized flange 32. If a determination is made during initial testing of the power train or at other time that a change is needed to the natural frequencies of the power train, the plugs 46 may be replaced by alternative plugs having a different mass, e.g., less dense, than the plugs initially installed in the holes 48. Changing the density of the plugs will cause the inertia of the load coupling and the power train to shift.

Figure 5:
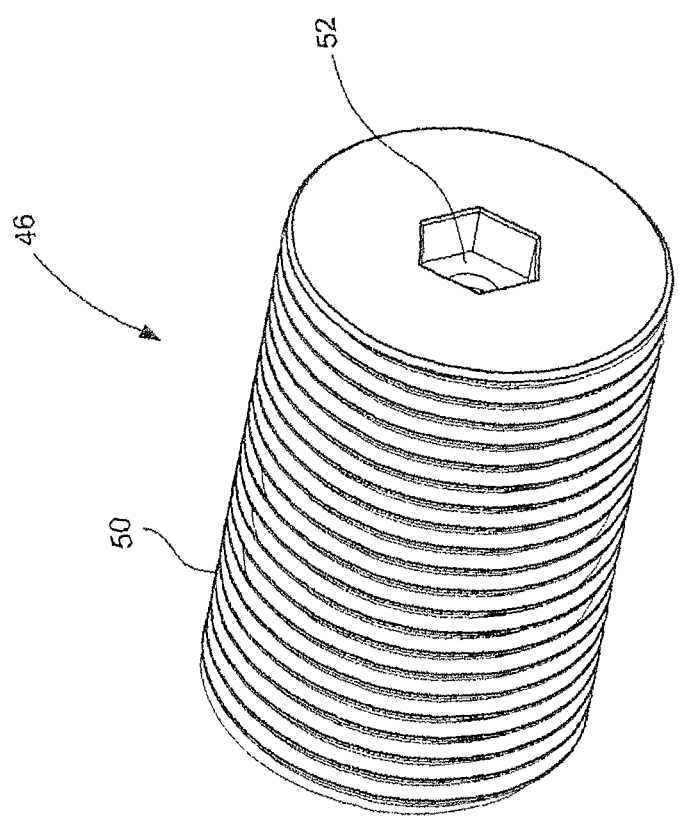
FIG. 5 is a perspective view of a plug to be inserted in the load coupling.

FIG. 5 is a perspective view of a side and front of an exemplary plug 46. The plug 46 may be a portion of a threaded rod, such that the threaded outer surface 50 of the plug engages threads on the inner cylindrical surface of the holes 48 in the flange 32. The plug may be circular in cross-section and have straight, center axis. A hexed recess 52 is aligned with the axis and in the front surface of the plug. The hexed recess 52 receives a hexed end tool which is used to insert and remove the plug from the holes 48 in the flange. The plugs 46 may be replaced and rearranged relatively easily and without disassembling other components of the power train.

The plugs 46 are an example of a trim mass that may be used to make fine adjustments to the frequency response of the power train. The trim masses may be used in addition to adding a larger mass to the load coupling to shift the torsional frequency natural modes of the power train. Alternatively, the trim masses may be included in a load coupling provided with the initial installation of a power train.

Figure 6:
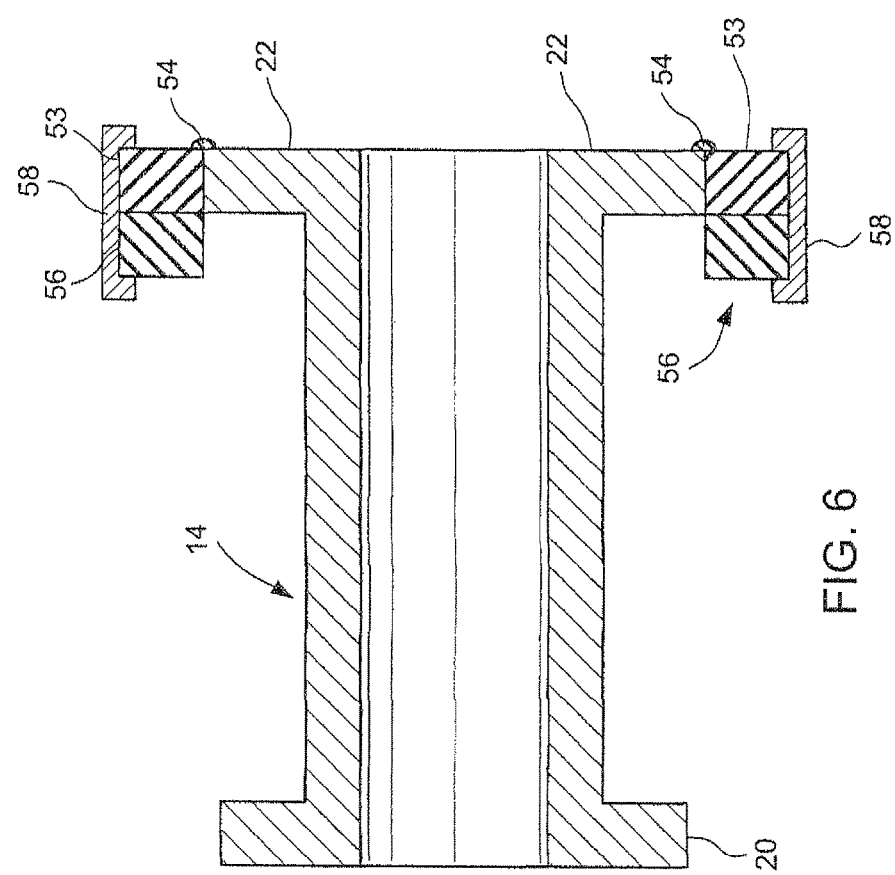
FIG. 6 is a cross-sectional view of a load coupling with added ring masses.

FIG. 6 is a cross-sectional view of a conventional load coupling 14 having a ring mass 53 attached to the perimeter of one of the flanges 22 of the load coupling. The ring mass 53 changes the inertia of the load coupling and hence shifts the torsional natural frequencies of the power train that includes the load coupling. The ring mass 53 may be metallic and formed of substantially the same metal as the load coupling.

The ring mass 53 may be press fitted and heat shrunk on the flange 22. The ring mass may be heated to cause it to expand. While expanded, the ring mass is moved in an axial direction to be pressed onto the outer circumference of the flange 22. This press fitting may be performed after segments of the ring mass have been welded to form an annulus around the shaft of the load coupling or after the load coupling has been disconnected from the rotor shaft of the turbine or generator. As the ring mass cools and shrinks onto the perimeter of the flange 22. An annular weld 54 may secure the ring mass to the flange 22.

Additional mass may be added to the load coupling 14 by one or more stacking ring masses with the first ring mass 53. The additional ring masses 56 may be stacked axially with the first ring mass 53. A clamp 58 may secure the ring masses 56, 53 together. Alternatively to stacking the ring masses axially, the ring masses may be mounted radially, e.g., superimposed, with each ring having a diameter slightly larger than the prior ring.

The additional ring masses 56 may be added sequentially with the vibration frequency response of the power train tested between each application of a ring mass. When the frequency response of the power train is acceptable, such as when the power train has sufficient torsional frequency margins.

FIGS. 7 and 8 are cross-sectional views of further embodiments of additional masses added to the flanges 60 of a load coupling 62 and flanges 64 of a generator or turbine shaft 66. The load coupling and flanges are shown only partially in FIGS. 7 and 8. An annular ring mass 68 may be integral with one of the flanges 60, 64 or may be fitted onto one or both of these flanges. The perimeter of the ring mass 68 includes one or more stepped ledges 70. Additional ring masses 72, 74 may be seated on the ledges 70. The ring masses 72 may be stacked axially as shown in FIG. 8 or stacked radially 74 as shown in FIG. 7. Further the ring masses may have different masses such as by having different cross-sectional shapes. The ring masses 68, 72, 74 may be formed of the same material as the flange 64 to allow for uniform thermal expansion and contraction of the rings and flanges.

The addition of the ring mass 68 may by itself be sufficient to shift the torsional natural frequencies of the power train such that the torsional frequency margins are sufficient. If the ring mass 68 is not sufficient, the additional ring masses 72, 74 may be added sequentially to tune the frequency response of the power train and ensure adequate margins associated with the natural frequencies of the power train.

The ring masses 68, 72 and 74 may be secured to the flange 64 by an annular ring or shank 76 that abuts the ring masses 68, 72 or 74. The shank 76 may be an annular array of teeth welded 78 to the flange 60. The ring or shank 76 may have sufficient mass to contribute to the shift in inertia and torsional natural frequencies provided by the ring masses 68, 72 or 74.

FIGS. 9 and 10 are cross-sectional views, taken parallel to the load coupling axis and perpendicular to the axis respectively, of a further embodiment of additional masses added to the flanges 60 of a load coupling 62 and flanges 64 of a generator or turbine shaft 66. The ring mass 80 has an internal annular slot 82 which receives ring bands 84, 86 or plates 88 that add mass to the ring mass 80. The annular slot may be continuous around the flange 64 or segmented into individual chambers as shown in FIG. 10. If the slot 82 is continuous, the added masses may be the ring bands 84, 86. If the slot 82 is segmented, the plates 88, see FIG. 11, may be added in selected segments of the slot. The ring bands 84, 86 and plates 88 are added to adjust the inertia of the load coupling and thereby tune the frequency response of the power train.

FIG. 12 is a cross-sectional view of a further embodiment of adding mass to the flanges 60, 64 of a load coupling 62 and shaft 66 of a power train. An annular ring 90 with an interior chamber 92 is added to or integral with any of the flanges 60, 64. If mass needs to be added to shift the torsional natural frequencies, a liquid is pumped from a liquid source 94 into the chamber 92. The amount of fluid pumped into the chamber is determined based on the amount of mass needed to be added to shift the torsional natural frequencies of the power train and the amount of shift desired. During operation, the centrifugal force due to rotation of the ring 90 will cause the liquid to move radially outward in the chamber 92.

Figure 13:
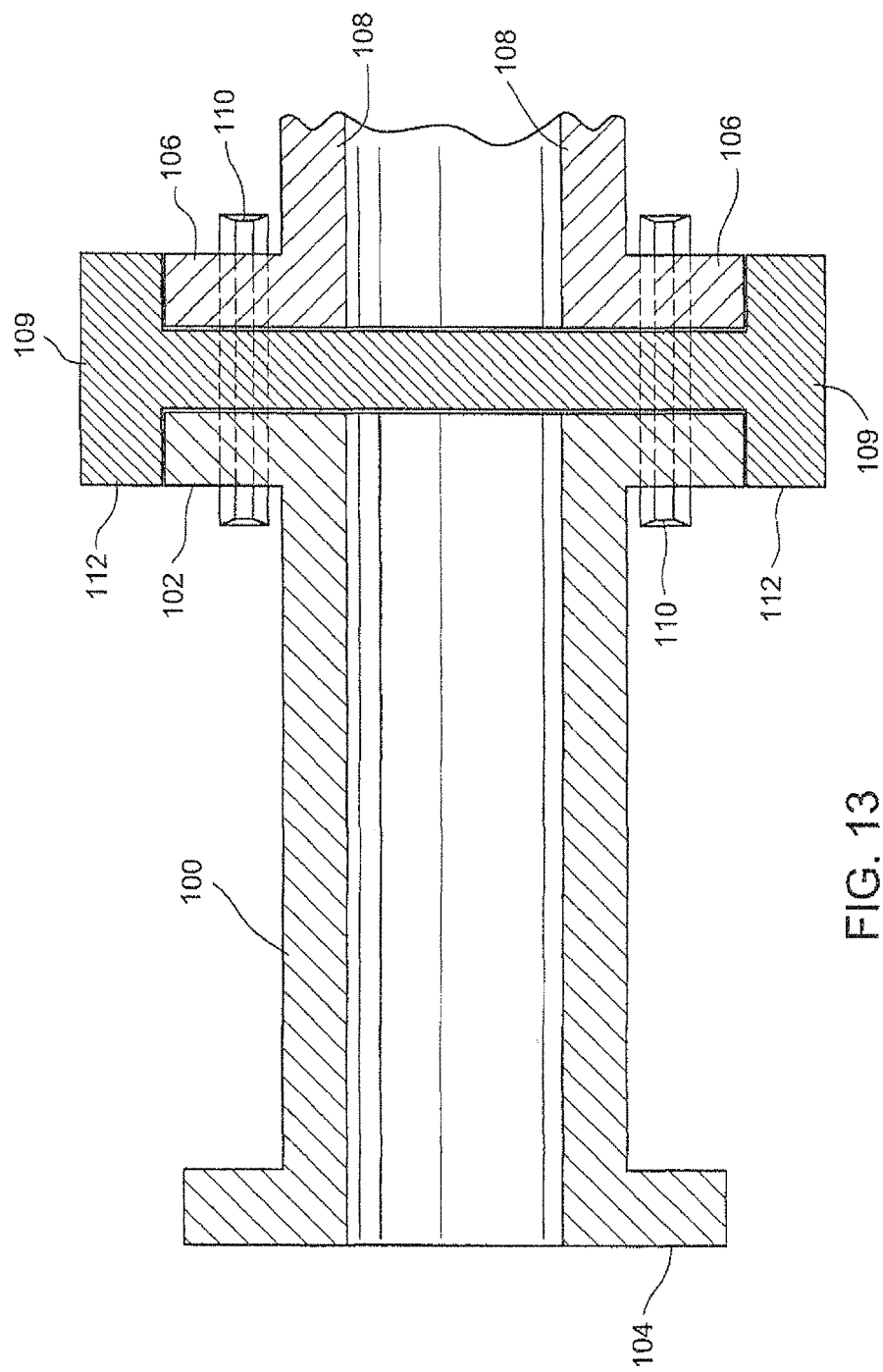
FIG. 13 is a cross-sectional diagram of a shortened load coupling and a mass disc sandwiched between the load coupling and shaft.

FIG. 13 is a cross-sectional diagram of a shortened load coupling 100 having normal diameter flanges 102, 104 which are bolted to the flanges 106 of the shafts 108 for the turbine and generator. The load coupling 100 does not extend the full distance between the ends of the shafts. The load coupling 100 may be substituted for an existing load coupling such as 14 in FIG. 1.

A mass disc or ring 109 is sandwiched between the flange 102 of the load coupling and the flange 106 of the shaft 109. Bolts 110 extend through aligned openings in both flanges and the disc or ring 109 to couple the assembly together.

The mass disc 109 may be a circular or annular device having a mass sufficient to change the inertia and torsional natural frequency of the power train. The mass disc may have a radial outward region 112 that has more mass than radially inward portions of the disc. Concentrating the mass of the disc radially outward increases the shift in torsional inertia resulting from the addition of the mass disc 109.

Figure 14:
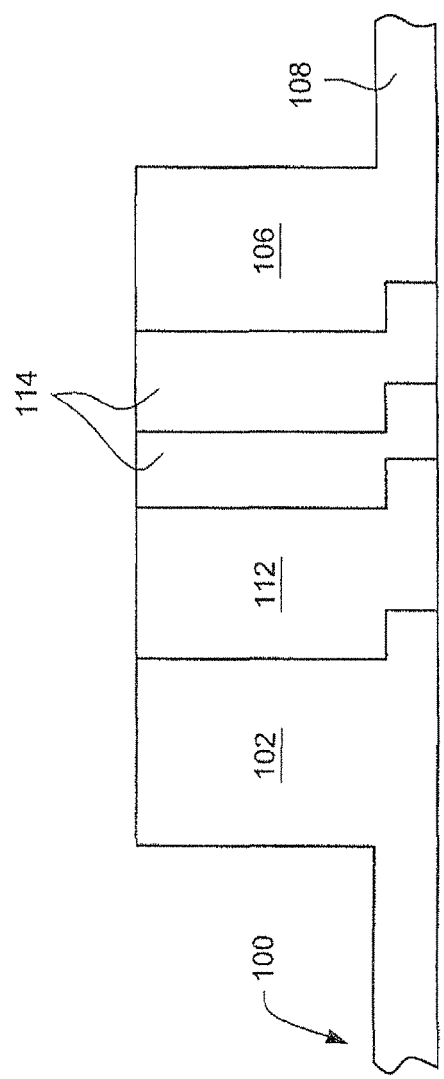
FIG. 14 is a cross-sectional view of a further embodiment of adding mass between the load coupling and a shaft in the power train system.

FIG. 14 is a cross-sectional view of a further embodiment of adding mass between the flange 102 of a load coupling 100 and the flange 106 of a shaft 108 in the power train system. Whereas FIG. 13 shows a single disc 109 sandwiched between the flanges, FIG. 14 shows a stack of two or more rings or discs sandwiched between the flanges. A first disc or ring 112 may be relatively thick and add a substantial amount of mass to the load coupling and power train. The first disc or ring 112 may be selected to approximate the desired mass needed to shift the torsional natural frequencies of the power train. One or more thinner discs or rings 114 may be stacked between the first disc 112 and a flange 106 to tune the natural frequencies and frequency response of the power train. The thinner discs may have less mass, e.g., between one half to one quarter, the mass of the first disc 112. The thinner discs may be added sequentially and as each disc 114 is added, the power train may be tested to determine if its frequency response provides adequate margins about the torsional natural frequencies.

Figure 15:
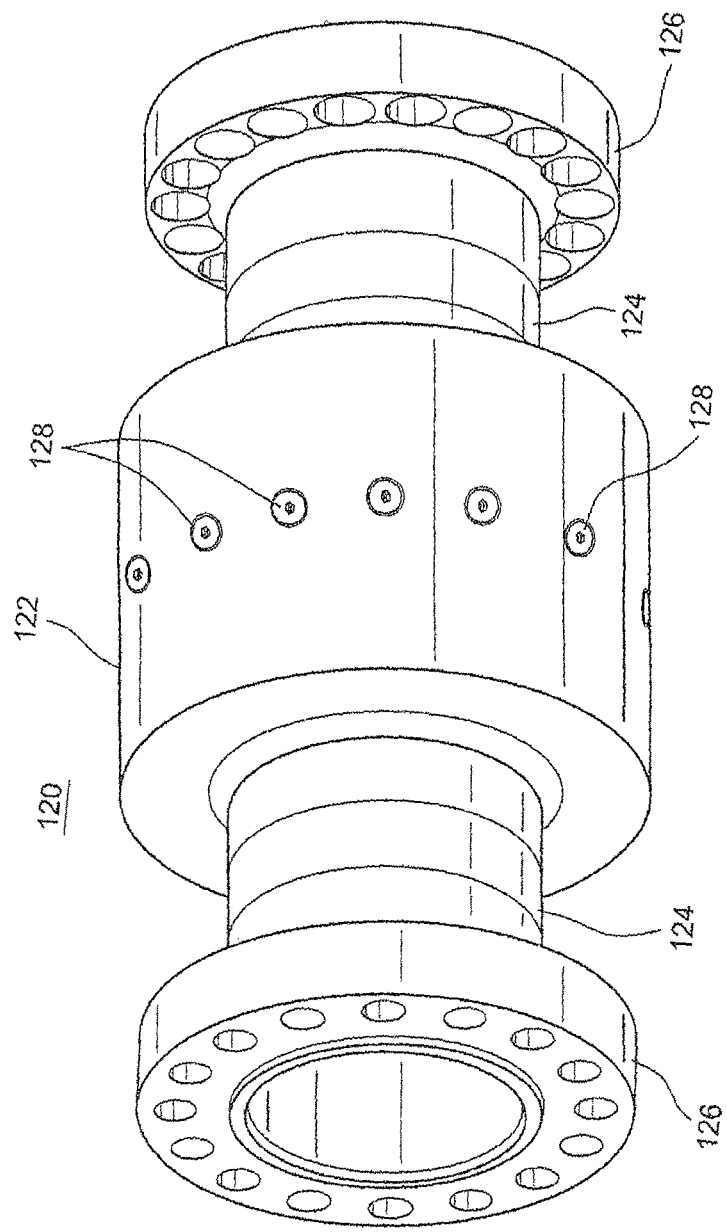
FIG. 15 is a perspective view of another embodiment of a load coupling which has an added mass included with the shaft of the coupling.

FIG. 15 is a perspective view of the side and an end of a load coupling 120 having, as an added mass, an annular collar 122 added to the shaft 124. The flanges 126 at opposite ends of the load coupling may be sized to connect to respective flanges on a turbine and a generator.

The annular collar may be integral with the shaft of the load coupling or added, e.g., welded or clamped, to the shaft of the load coupling. The annular collar may be coaxial to the axis of the load coupling and aligned with the longitudinal center of the load coupling. The outer cylindrical surface of the annular collar may include recesses for trim masses 128. The trim masses 128 may be threaded plugs which are inserted in threaded openings in the annular collar. The trim plugs may be removed or replaced with other trim plugs having differing masses. The removal and replacement of trim plugs may be used to make fine adjustments, e.g., tune, the frequency response of the power train which includes the load coupling 120.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A power train comprising:
    a torque producing power source including a rotating connecting flange;
    a torque driven power load including a rotating connecting flange;
    a load coupling having a first flange adapted to couple to the connecting flange of one of the torque producing power source and the torque driven power load;
    a second flange on the load coupling adapted to couple to the connecting flange of the other of the torque producing power source or the torque driven power load;
    an additional mass attachable to at least one of the connecting flanges or the load coupling wherein the additional mass is configured to shift a torsional natural frequency of the power train away from a torsional frequency corresponding to an operational condition of the power train and the additional mass is symmetrically distributed about a longitudinal axis of the power train, and
    trim masses configured to be sequentially added to the additional mass.

2. The power train as in claim 1 wherein the additional mass is an annular ring extending radially outward from a coupling region of the first flange.

3. The power train as in claim 2 wherein the annular ring is integral with the first flange, and the load coupling is adapted to be substituted for an existing load coupling in the power train.

4. The power train as in claim 3 further comprising removable trim mass plugs arranged in a circular array in the annular ring.

5. The power train as in claim 2 wherein the annular ring is fitted to an outer circumference of the first flange.

6. The power train as in claim 1 wherein the trim masses are at least one of plugs arranged in an annular array, rings and plates arranged in an annular array.

7. The power train as in claim 1 wherein the additional mass is added to a shaft of the load coupling.

* * * * *